United States Patent [19]
Uchida

[11] 3,779,597
[45] Dec. 18, 1973

[54] APPARATUS FOR SECURING AN ARTICLE IN A TWO-WHEEL VEHICLE

[75] Inventor: Masaaki Uchida, Tokorozawa, Japan

[73] Assignee: Honda Giken Kogyo Kabushiki Kaisha, Tokyo, Japan

[22] Filed: Mar. 16, 1972

[21] Appl. No.: 235,363

[30] Foreign Application Priority Data
Mar. 22, 1971 Japan............................46/19092

[52] U.S. Cl.......................... 296/37, 211/4, 224/31, 248/203, 297/192, 297/195, 224/42.45 B
[51] Int. Cl............................................ B60r 11/00
[58] Field of Search............... 224/31, 40, 39, 30 R, 224/29 D, 42.45 B, 42.46 B, 42; 280/226, 227, 202; 296/63, 69, 37; 248/203; 211/8, 9, 4; 297/192, 195; 24/241 PP, 241 P, 241 SB

[56] References Cited
UNITED STATES PATENTS
2,755,873  7/1956  Klaue................................. 180/35
3,690,130  9/1972  Eutzler............................... 211/4 X
2,986,365  5/1961  Boudouris.......................... 248/203

Primary Examiner—Gerald M. Forlenza
Assistant Examiner—Jerold M. Forsberg
Attorney—Eric H. Waters et al.

[57] ABSTRACT

A helmet or similar article is attached to the body of a two wheel vehicle by hooking its buckle on a hook member on the body of the vehicle. The hook member is positioned on the body so as to be covered by a pivotable seat when the latter is lowered to operative position so that removal of the helmet is prevented. A lockable engaging means is provided between the seat and vehicle body. In order to prevent unhooking of the article from the hook member when the seat is lowered, a projection is formed in the lower surface of the seat to close any gap which might be formed or alternatively, a recess is formed in the seat in which the hook member is received.

5 Claims, 3 Drawing Figures

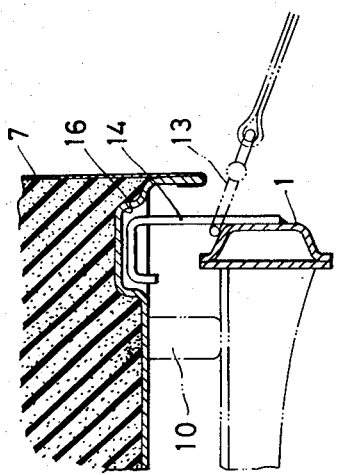
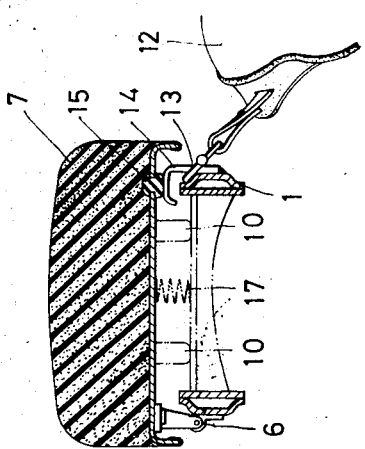

APPARATUS FOR SECURING AN ARTICLE IN A TWO-WHEEL VEHICLE

BRIEF SUMMARY OF THE INVENTION

This invention relates to an article engaging apparatus in a two-wheel vehicle wherein an article such as a helmet or the like can be engaged with the vehicle body.

According to the invention, the apparatus comprises a vehicle body, a seat turnably attached at one side edge thereof to the vehicle body, an engaging apparatus having a lock and including one portion on the vehicle body and a second portion on the other side edge of the seat, and a hook member secured to the vehicle body for hooking an article.

According to a feature of the invention, the foregoing apparatus includes a means for preventing unhooking of an article from the hook member, the latter means being formed at the bottom surface of the seat so that when the seat is brought down, the means faces the hook member to prevent the article from being unhooked therefrom.

The hook member comprises one hook provided at the front part of the vehicle body and a second hook may be additionally provided on the rear part of the body. The means for preventing unhooking of the article may comprise a projection of elastic material at the bottom surface of the seat or a concave surface in the bottom surface of the seat.

BRIEF DESCRIPTION OF THE DRAWING

FIG. 2 is a transverse sectional view of the apparatus in FIG. 1 with the seat lowered; and FIG. 3 is a fragmental sectional view on enlarged scale showing another embodiment of the invention in the condition in which the seat is lowered.

DETAILED DESCRIPTION

Figure 1:
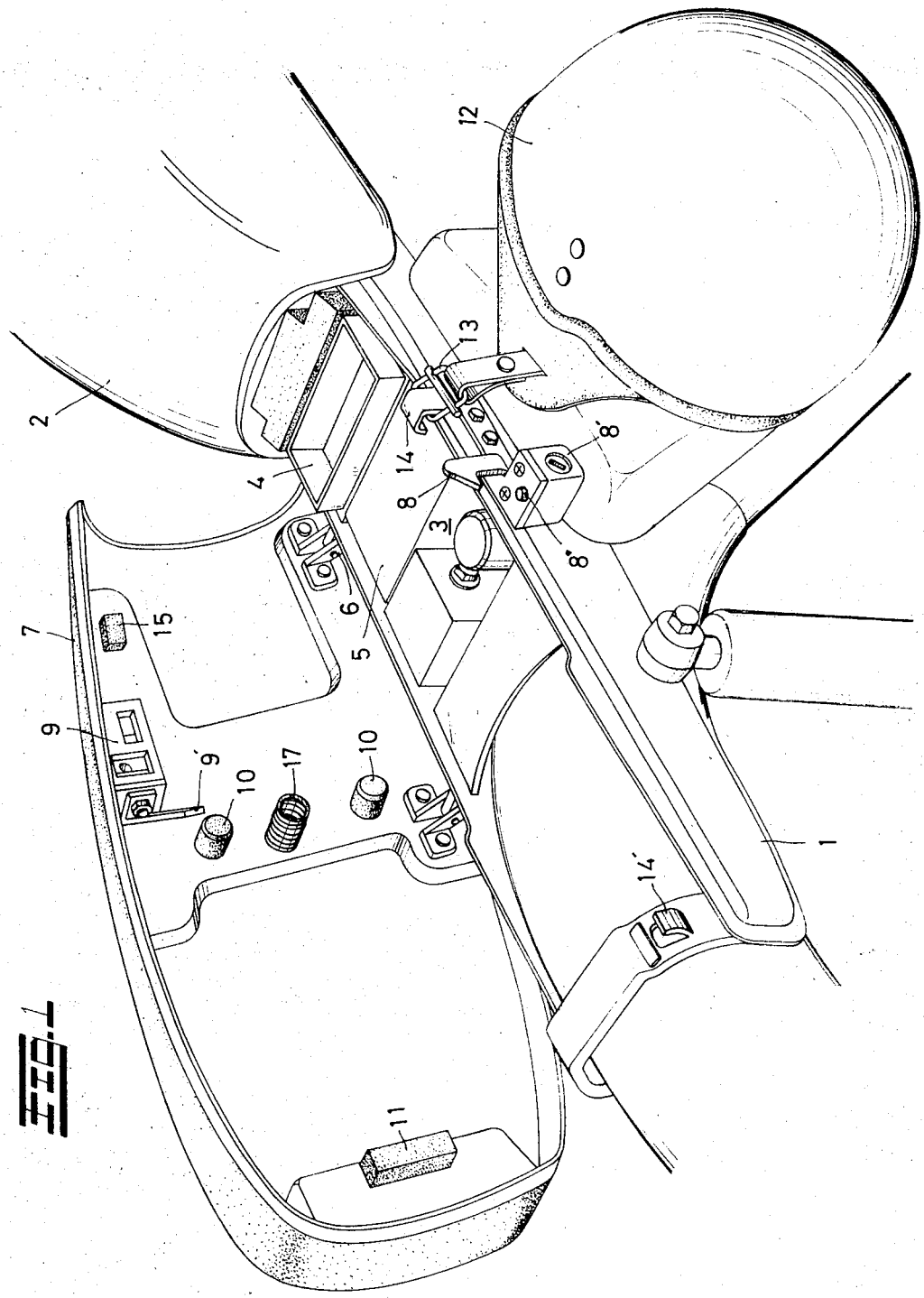
FIG. 1 is a fragmental perspective view of a two-wheel vehicle in which the seat is raised and one embodiment according to this invention is visible.

Referring to FIGS. 1 and 2, numeral 1 denotes a vehicle body of a two-wheel such as a motorcycle and numeral 2 denotes a fuel tank thereof. Behind the fuel tank 2 there is found in body 1 a housing section 3 for accommodating a tool box 4, a storate battery 5 etc. A seat 7 is pivotably attached at one side thereof by hinge members 6 to one side of the upper portion of the vehicle body 1 so that the seat can be lowered to cover the open portion of the housing section 3 or be raised to uncover the same.

A male member 8 and a female member 9 of an engaging apparatus are provided at the other side upper portion of the vehicle body 1 and the other side edge of the seat 7, respectively. These male and female members 8, 9 are engageable with one another when the seat 7 is lowered for engagement with the vehicle body 1. The male member 8 incorporates a lock 8' for advancing and retracting a pin 8'' adapted for checking movement of the female member. The female member 9 has a release lever 9'.

Elastic elements 10 and 11 made of rubber, synthetic resin or the like are adhered to the center portion and the rear portion, respectively, of the bottom surface of the seat 7, and these are arranged to be brought into contact with the vehicle body when the seat 7 is lowered so as to provide a resilient support for the seat 7.

Numeral 17 denotes a spring for pushing the seat 7 upwards.

A hook member 14 for hooking a buckle 13 of an article such as a helmet 12 is secured to the upper side edge portion of the vehicle body 1.

Accordingly, when the engagement between the male and female members 8, 9 of the engaging and locking apparatus is released by the operation of the release lever 9', the seat 7 is slightly lifted by the action of the spring 17, so that the seat 7 can be easily raised as shown in FIG. 1 by inserting a hand below the seat 7. If, after the buckle 13 of the helmet 12 is hooked on the hook member 14, the seat 7 is lowered and the engaging apparatus is locked, the hook member 14 is covered by the seat 7 and there is not sufficient room to insert a hand below the seat 7 so that the buckle 13 cannot be unhooked from the hook member 14. Thereby, the helmet 12 is secured in a position which is resistant to theft.

If, however, there is a gap between the upper surface of the hook member 14 and the lower surface of the seat 7, the buckle 13 can be unhooked from the hook member 14 through this gap and thus the resistance to theft of the helmet 12 is not sufficient.

According to a further feature of this invention this is obviated by the provision of a projection 15 of elastic material on the bottom surface of the seat 7 facing the hook member 14, so that when the seat 7 is lowered as shown in FIG. 2 the projection 15 is brought into contact with the upper surface of the hook member 14 to close the foregoing gap whereby the projection 15 serves as a means to prevent unhooking of the hook member 14.

It is not always necessary for the projection 15 to be employed and the elastic elements 10, 11 or the like may also be used for this purpose.

In the illustrated embodiment, an additional hook member 14' is provided at the rear part of the vehicle body so that a helmet or the like can also be hooked thereon.

In another embodiment of this invention as illustrated in FIG. 3, a concave or recessed portion 16 is formed in the bottom surface of the seat 7 instead of the projection 15 in the foregoing embodiment. When the seat 7 is lowered, the concave portion 16 covers the upper surface of the hook member 14 so that there is formed an irregular or tortous path between the hook member 14 and the concave portion 16 for preventing the buckle 13 of the helmet 12 from being unhooked. In this case, the side wall of the concave portion 16 serves as a stop for the hook member 14 so to prevent the hook member 14 from being bent or broken even if a large force is applied to the hook member 14 by forcedly pulling on the helmet 12.

Thus, according to this invention, an article such as a helmet can be easily hooked on the vehicle body by means of the hook member secured to the Vehicle body, and this article can be rendered theft resistant by lowering the seat turnably attached to the vehicle body while additional theft resistance can be provided by the means for preventing unhooking of the buckle of the helmet from the hook member. Additionally, the seat can also be used for safe storage of articles housed in the vehicle body.

Since the article is hung at the side surface of the vehicle body, when a safety device such as a helmet is hooked, the driver is required, before driving the vehicle, to remove the safety device and wear the same. The apparatus is thus effective as a safety measure.

What is claimed is:

1. Apparatus for hooking an article on a two-wheel vehicle, said apparatus comprising a vehicle body, a seat pivotably attached at one side thereof to the vehicle body for movement between a raised inoperative position and a lowered operative position, said body being provided with a recess adapted for storage purposes, said seat covering said recess when lowered, engaging means including lock means provided on the vehicle body and the other side edge of the seat for locking the seat to the vehicle body when the seat is lowered, a hook member secured to the vehicle body for hooking an article thereon, said hook member being positioned on the body so as to locate said article in a position in which it interferes with seating of an operator on the seat of the vehicle, the hook member being covered by said seat when the latter is lowered to prevent removal of the article, and means at the bottom surface of the seat facing the hook member when the seat is lowered for preventing unhooking of the article.

2. Apparatus as claimed in claim 1, wherein said hook member is located at the front part of the vehicle body and further comprising a second hook member on the rear part of the vehicle body.

3. Apparatus as claimed in claim 1, wherein said means for preventing unhooking of the article comprises a projection of elastic material on the bottom surface of the seat.

4. Apparatus as claimed in claim 1, wherein said means for preventing unhooking of the article comprises a concave portion at the bottom surface of the seat covering said hook member when the seat is lowered.

5. Apparatus as claimed in claim 4 wherein said concave portion includes side walls embracing said hook member to form a tortous path therewith.

* * * * *